(12) United States Patent
Barringer (10) Patent No.: US 6,765,383 B1
(45) Date of Patent: Jul. 20, 2004

(54) MAGNETOTELLURIC GEOPHYSICAL SURVEY SYSTEM USING AN AIRBORNE SURVEY BIRD

(76) Inventor: Anthony R. Barringer, 25060 Montane Dr., Golden, CO (US) 80601

( * ) Notice: Subject to any disclaimer, the term of this patent is extended or adjusted under 35 U.S.C. 154(b) by 11 days.

(21) Appl. No.: 10/328,427

(22) Filed: Dec. 23, 2002

Related U.S. Application Data (60) Provisional application No. 60/343,736, filed on Dec. 26, 2001.

(51) Int. Cl.[7] .................................................. G01V 3/16
(52) U.S. Cl. ...................................... 324/330; 324/331
(58) Field of Search ........................... 324/95, 350, 330, 324/331; 343/719, 705–708

(56) References Cited

U.S. PATENT DOCUMENTS

| | | | | |
|---|---|---|---|---|
| 3,490,032 A | * | 1/1970 | Zurflueh | 324/345 |
| 3,614,600 A | * | 10/1971 | Ronka | 324/330 |
| 3,617,866 A | * | 11/1971 | Dowsett et al. | 324/330 |
| 3,872,375 A | * | 3/1975 | Ronka | 324/330 |
| 3,936,728 A | * | 2/1976 | Ghosh et al. | 324/335 |
| 4,367,439 A | * | 1/1983 | Fraser | 324/330 |

\* cited by examiner

*Primary Examiner*—Reena Aurora
(74) *Attorney, Agent, or Firm*—Edwin H. Crabtree; Ramon L. Pizarro; Donald W. Margolis (57) ABSTRACT

A magnetotelluric geophysical survey system used with an airborne survey bird for natural resource exploration of oil and gas, mineral deposits and aquifers. The survey system uses natural electromagnetic EM fields as an energy source. The magnetotelluric airborne survey system includes an aerodynamic airborne survey bird adapted for being towed behind a helicopter or fixed wing aircraft. The survey system can also be incorporated into a fixed wind aircraft. The survey system includes a non-conductive nose boom on the survey bird with orthogonal electric dipoles for measuring electric fields from 0.01 Hz up to 480 Hz. An angular motion detector is mounted inside the bird and used for compensating for errors caused by angular motion of the bird when in the presence of strong electric field gradients. The survey bird can use a single magnetometer or pairs of magnetometers for measuring electromagnetic gradients. The magnetometers are attached to angular motion detectors for compensating for errors caused by angular motion of a line between the magnetometers, when in the presence of strong magnetic gradients. The bird can also includes the orthogonal axis coils for measuring natural magnetic fields in a frequency range of 3 to 480 Hz. The airborne survey system is used in conjunction with a ground base station that includes a cesium magnetometer, associated recording equipment and a GPS time reference for synchronization with the airborne data.

20 Claims, 5 Drawing Sheets

'RAIN' GOLD MINE NEVADA AT DEPTH OF 1350 Ft. WITH ASSOCIATED SULFIDES.

FIG. 7

HIGH ALTITUDE FLIGHT ACROSS MINING AREA

FIG. 8.

FLIGHT LINE ACROSS A MAJOR GAS FIELD.

MAGNETOTELLURIC GEOPHYSICAL SURVEY SYSTEM USING AN AIRBORNE SURVEY BIRD

This application is based on a provisional patent application filed in the U.S. Patent and Trademark Office on Dec. 26, 2001 and having Serial No. 60/343,736.

BACKGROUND OF THE INVENTION (a) Field of the Invention

The subject invention relates to a unique airborne survey bird with a geophysical survey system for natural resource exploration of oil and gas, mineral deposits and aquifers and using natural electromagnetic fields as an energy source.

(b) Discussion of the Prior Art

Heretofore, airborne electromagnetic systems have been in use for natural resource exploration from about 1950 onwards. These systems depend mainly upon the measurement of the magnetic and conductive properties of the underlying ground. Airborne magnetic survey systems, that employ magnetometers with advanced stages of development, provide very satisfactory results. However, airborne conductivity measurements of the underlying terrain made with airborne electromagnetic systems that currently exist, leave a great deal of room for improvement. These systems typically operate at a minimum terrain clearance with respect to safety and employ electromagnetic transmitters operating in the frequency range from about 20 Hz. to 50 kHz with limited ground penetration. The secondary fields induced in the underlying ground by these transmissions are detected by receiving coils mounted in a tail boom on an aircraft or in an airborne survey bird towed behind the aircraft Either fixed wing aircraft or helicopters are used for these surveys. The response from the underlying ground is related to it's conductivity and the depth of penetration of the transmitted fields. The latter is primarily a function of the frequency employed and the field strength of the electromagnetic field that is generated by the equipment. Typical maximum penetrations are in an order of up to 1000 ft.

The only exception to the above description was an airborne system known as "AFMAG" that was developed by S. H. Ward and others in the 1960's. (S. H. Ward et al. AFMAG-Applications and Limitations. Geophysics, Vol. XXXI, No. 3 (June 1966), pp. 576–605.) This system utilized the natural electromagnetic fields generated by lightning events occurring in distant electrical storms. These storms can provide a source for electromagnetic energizing of the ground, primarily in the frequency range of 20 Hz. to 500 Hz. Useable frequencies down to about 3 Hz. exist but high quality receiving coils and coil anti-vibration mountings are required for the lower frequencies. These were apparently not available in the AFMAG system.

Although the AFMAG system showed some promise, it did not achieve sufficient commercial acceptance to survive for more than a short period. Amongst the various problems of the system was the absence of the sophisticated instrumentation and digital data acquisition and processing systems that were not available at that time. Also, very importantly, there was a lack of adequate technology for suppressing the prime sources of noise, such as angular vibration of the detection coils in the presence of a strong magnetic field in the earth. The latter is associated with a motor generator effect that can detect a millionth of a degree of angular vibration.

The AFMAG system was also restricted to the use of audio frequency fields and did not employ extremely low frequency and much more powerful natural magnetotelluric fields, as used in the present invention. Just as importantly, the AFMAG system as well as all other airborne electromagnetic systems, past or present, did not make use of the valuable data available in the electric field components of electromagnetic fields.

The present invention demonstrates that electric field data, as measured by methods that do not make contact with the ground, can be more important than the magnetic component of electromagnetic fields. Experience with the present invention has also shown that, for specific reasons, the measuring of the electric field data is particularly valuable at frequencies below 3 Hz. This type of information is completely missing in the old AFMAG system as well as current airborne electromagnetic systems. The field data lies in the range of frequencies from 0.01 Hz. to 3 Hz. and is used in the present invention for the airborne detection of an induced polarization phenomena Also, related response of dielectric interfacial polarization effects can be detected over aquifers and oil and gas fields. These low frequency polarization effects, which are particularly important in the electric fields, are discussed herein.

A still further very important factor in comparing the present invention with other systems, is that for certain specific reasons, as presented, the operation can function at unusually high terrain clearances of 1000 ft. to 2000 ft. All other airborne systems that use transmitters have to fly at clearances in the range of 300 to 500 ft., which adds to potential problems related to interferences from power lines and pipelines. These interferences badly degrade data quality and often in areas where discovery potential is the greatest. With the present invention operating at much greater clearances and at very low frequencies, these problems disappear for all practical purposes.

SUMMARY OF THE INVENTION

A primary object of the subject invention is to provide a unique airborne survey bird using a new airborne electromagnetic technique for deep exploration using natural magnetotelluric fields as an energy source and operating in a frequency range of 480 Hz. down to 0.01 Hz The new survey system provides both deep and shallow exploration information, such as induced polarization effects, which heretofore was not available using current airborne systems and ground geophysical systems.

Another object of the airborne survey bird is it can operate at much higher terrain clearances from 1000 to 2000 feet when compared to other airborne systems operating in a range of 300 to 500 feet above the ground surface.

Yet another object of the invention is provide an airborne survey system on the survey bird that can explore for oil and gas, mineral deposits and aquifers with penetration down to thousands of feet in the ground surface. Also, the survey system detects very important effects in three orthogonal components of an electric field, which are not observed in other airborne or ground geophysical exploration systems. Further, the airborne survey system can detect underground aquifers using airborne methods for identifying dielectric double layer interfacial polarization effects associated with an abnormally high dielectric constant of water in contact with earth materials having a dielectric constant and conductivity that is fractional when compared with water.

Still further, the invention can be employed with a fixed network of stations on the ground in areas of earthquake hazards and volcanic eruptions for monitoring subsurface movements of fluids that may be precursors to a dangerous event. The measurement of the movements can cover a depth region from a few hundred feet to thousands of feet.

A further object of the airborne survey system is it can operate at a fraction of the weight of other airborne survey systems that employ large, heavy and costly transmitters. Also, the new survey system can be used offshore where the above mentioned airborne survey bird replaces a "fish" towed by a marine vessel, such as a seismic ship.

The subject magnetotelluric airborne survey system includes an aerodynamic airborne survey bird adapted for being towed behind a helicopter or fixed wing aircraft. The survey bird can include a single magnetometer or include two pair of magnetometers for measuring electromagnetic gradients. The magnetometers are attached to angular motion detectors for compensating for errors caused by angular motion of a line between the magnetometers, when in the presence of strong magnet gradients. The bird also includes the orthogonal axis coils for measuring natural magnetic fields in a frequency range of 3 to 480 Hz Further, a nose boom of the survey bird includes orthogonal electric dipoles for measuring electric fields from 0.01 Hz up to 480 Hz. The airborne survey system is used in conjunction with a ground base station that includes a cesium magnetometer, associated recording equipment and a GPS time reference for synchronization with the airborne data.

These and other objects of the present invention will become apparent to those familiar with ground and airborne geophysical survey systems and airborne survey birds when reviewing the following detailed description, showing novel construction, combination and elements as described herein, and more particularly defined by the claims, it being understood that changes in the embodiments in the disclosed invention are meant to be included as coming within the scope of the claims, except insofar as they may be precluded by the prior art.

DESCRIPTION OF THE PREFERRED EMBODIMENTS

Figure 1:
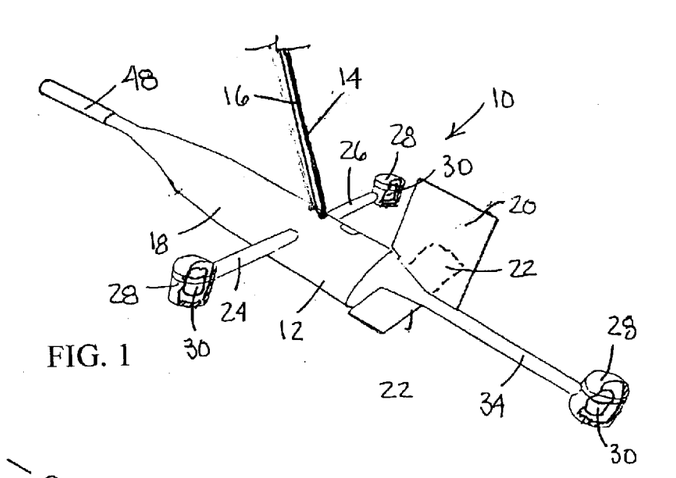
FIG. 1 illustrates a perspective view of the subject airborne survey bird having an aerodynamic housing for holding the geophysical survey system therein. The bird is designed for towing behind a helicopter or fixed wing aircraft.
Figure 2:
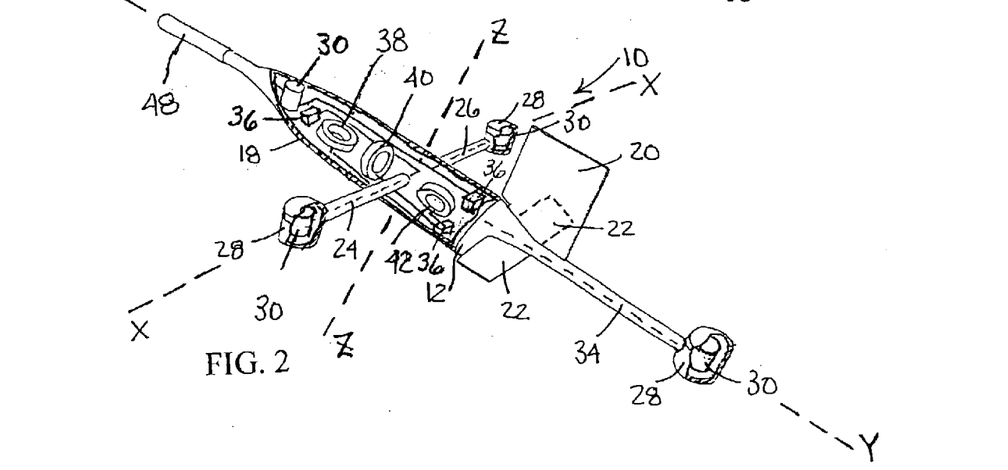
FIG. 2 is another perspective view of the survey bird showing the position of the three orthogonal magnetic field coils inside the bird. Also, the bird includes a nose boom for carrying orthogonal electric field sensors.

In FIGS. 1 and 2, a perspective view of the subject airborne survey bird is shown having general reference numeral 10. The survey bird 10 can be made of fiberglass and is approximately 12 feet in length. The bird 10 is used for carrying a magnetotelluric geophysical system described herein. The bird 10 has an aerodynamic housing 12 attached to a tow cable 14 for being towed behind a helicopter or fixed wing aircraft. The helicopter or fixed wing aircraft is not shown in the drawings. The tow cable 14 is typically in a range of 100 to 200 feet or greater in length. The tow cable 14 includes a multiple coaxial electrical cable 16 connecting the magnetic and electrical sensors inside the bird to a 24-bit digital recording system inside the helicopter or fixed wing aircraft. It should be mentioned that the tow cable 14 is attached to the bird 10 at its center of gravity via approximately three feet of elastic bungee cord. The bungee cord has a load rating appropriate for the weight of the bird. This type of attachment serves to reduce the translation of vibration in the tow cable 14 through to the bird 10. While not shown in the drawings, survey system is also applicable to fixed wing aircraft where the sensors are installed in a combination of the wingtips and a tail boom.

An outer shell 18 of the housing 12 is covered with a thick layer of resilient foam that is surface coated with a smooth flexible skin in order to provide a compliant surface. The smooth flexible skin of the shell 18 reduces the generation of linear and angular vibration associated with drag and boundary layer turbulence. The bird 10 also includes a vertical tail fin 20 and horizontal tail stabilizers 22 for stabilizing the bird 10 in flight.

In this drawing, ends of a first horizontal side boom 24 and a second horizontal side boom 26 are shown having pods 28 for installing and carrying cesium vapor, potassium or alkali vapor total field magnetometers 30 therein. The pods 28 have been cutaway to illustrate the magnetometers 30 inside. The two magnetometers 30 provide both magnetic and low frequency electromagnetic field gradients along an "X" axis or perpendicular to the flight direction of the bird 10. These magnetometers 30 are used in conjunction with two similar magnetometers 30 installed in a front section 32 of the housing 12 and in a tail pod 28 attached to a tail boom 34 extending rearwardly from the housing 12. The magnetometers 30 installed along a length of the housing 12 and provide magnetic and low frequency electromagnetic field gradients, along a "Y" axis, parallel to the flight direction. While not shown in the drawing, a vertical pair of magnetometers can also be added to the bird 10. This arrangement provides vertical magnetic gradients and vertical magnetic components of low frequency electromagnetic field gradients along a "Z" axis perpendicular to the flight direction. The X, Y and Z axis are shown in FIG. 2.

A 3-axis set of commercial angular motion detectors 36 are installed inside the housing 12 for use in the compensation for the errors caused by angular motions of the line between pairs of magnetometers 30 in the presence of a magnetic gradient. The motion detectors 36 are based upon the use of vibrating quartz tuning forks and have an angular sensitivity of 0.003 degrees. They are fully adequate for use in compensation for noise produced by angular motions of electric field sensors in the presence of a static vertical electric field between the earth and the atmosphere. The pairs of magnetometers 30 provide magnetic field EM measurements and any noise due to the presence of magnetic field gradients is compensated using the angular motion detectors 36. The magnetometers 30 provide orthogonal frequency coverage from 0.01 to 3 Hz of the magnetic component of EM fields. The use of the magnetometers 30 have a major advantage over large low frequency coils that have a sensitivity to angular motions that exceeds the limits of angular motion detectors.

It should be mentioned that lower natural field frequencies termed magnetotelluric (MT) fields cover the range of 3 Hz down to 0.01 Hz. These fields originate from an interaction between the solar wind and outer reaches into space of the earth's magnetic field. The field strength of these signals increases by a factor of 100 times from 1 Hz down to 0.1 Hz and about 1000 times down to 0.05 Hz. These very strong low-frequency fields can provide penetrations down to 10,000 feet and deeper, which makes them uniquely effective for oil and gas exploration as well as for deep ore bodies. The magnetometers 30 are sampled at a rate of 10 times per second. At this sampling rate, it is possible to filter the magnetometer outputs at frequencies of 3 Hz. and lower using narrow band filters. Since the sensitivity of the magnetometers 30 is very high in the order of 1 picoTesla, the magnetometers provide a very sensitive measurement of the magnetotelluric (MT) fields. However, the sensitivity of the total field magnetometer is in the direction of the earth's magnetic field, so that the MT frequency measurements are also made in that direction. However, if pairs of magnetometers 30, as shown in the drawings, are used with a separation such as 10 feet, a measurement that is proportional to the gradient of the electromagnetic fields in the direction between the two magnetometers 30 can be measured with high sensitivity. The array of two pairs of magnetometers 30 provides the measurements of the fields in two orthogonal directions along the X axis and Y axis of the bird 10. Currently, such a measurement is not possible in a range of 3 Hz. down to 0.01 Hz. at the required sensitivity using different sensors.

The output of the magnetometers in the bird 10 is used in conjunction with a cesium magnetometer placed at a base station. The base station is typically not more than 20 miles from the survey area. The base station is not shown in the drawings. The output from the magnetometer at the base station is recorded at the 1 pico Tesla sensitivity level that is normal for commercially available magnetometers. This output can be filtered to provide frequencies from 0.01 Hz. to 3 Hz.

In FIG. 2, the housing 12 has been cutaway to show three orthogonal axis coils 38, 40 and 42 installed therein. Each of the coils carries 20,000 turns of 18 gauge enameled copper wire. The coils are covered with electrostatic shields made of aluminum foil with care being used to avoid short circuiting closures of the foil wrapping. The three coils 38, 40 and 42 are used with the survey system for detecting three directional components of a natural magnetic field in a frequency range of 3 Hz. To 480 Hz. In this drawing, the front coil 38 provides a vertical component along the Z axis, the second coil 40 provides a horizontal component along the Y axis and parallel to the flight direction, and the third coil 42 provides a horizontal component along the X axis and perpendicular to the flight direction.

The coils orthogonal axis coils 38, 40 and 42 detect fields originating from lightning that can be at a range of 200 miles or more away from the survey area The electromagnetic signal from these lightning occurrences are semi-continuous and they penetrate into the ground down to about 1000 feet. They are used in the invention for detecting conductive features in the ground occurring within this depth range. They have applications in the search for conductive mineralization but they cannot penetrate down to ore deposits that lie within mineable depths below 1000 feet.

Figures 3, 4, 5, 6:
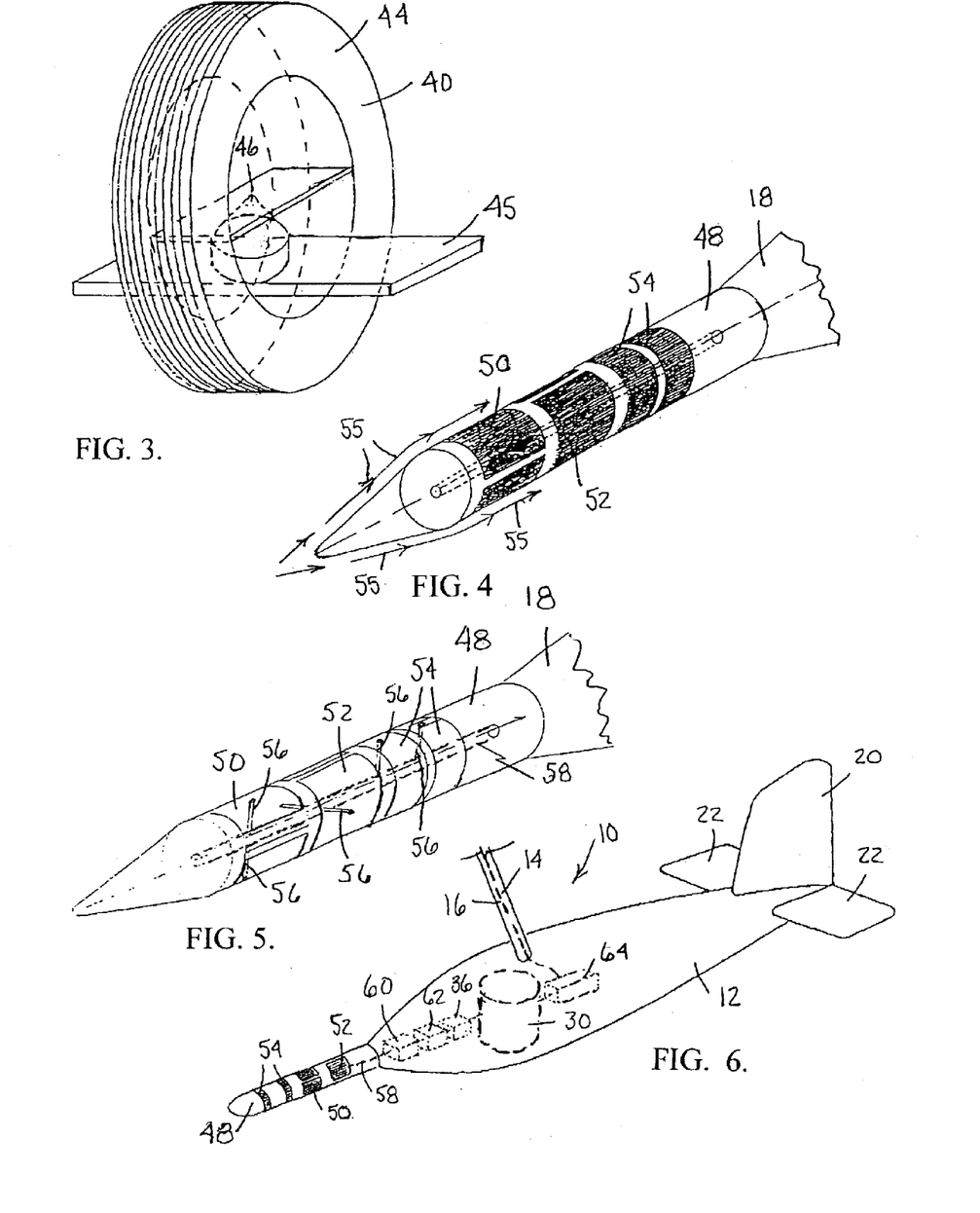
FIG. 3 is a perspective view on one of magnetic field coils mounted inside the housing of the survey bird. The coil is covered with an electrostatic shield made of aluminum foil.
FIG. 4 is a perspective view of the nose boom with three large surface orthogonal electric dipoles disposed around the nose boom's exterior surface for measuring electric fields having a bandwidth from 0.01 Hz to 480 Hz.
FIG. 5.is another perspective view of the nose boom illustrating the interior wiring used for connecting the dipoles to low noise amplifiers inside the housing of the bird.
FIG. 6 illustrates another embodiment of a simplified version of the subject airborne survey bird shown in FIGS. 1 and 2.

In FIG. 3, an enlarged perspective view of the magnetic field coil 40 is shown and mounted inside the housing 12 of the survey bird 10. The coil 40 is covered with an electrostatic shield 44 made of aluminum foil. The coils 38, 40 and 42 are supported at their centers of gravity using rubber shock mounts 45 having the appropriate load rating for the weight of each coil. All angular vibration is transmitted through a flexible pivot point 46, which provides a significant degree of isolation. Still further, isolation from angular vibration is provided by covering the shield 44 with acoustic isolation foam, made of a plastic material. This reduces vibration introduced in the coils via acoustic pressure waves in the air within the bird 10. The void spaces within the bird are also filled with similar acoustic foam to help absorb vibrational pressure waves and prevent them from echoing. It should be mentioned that the suppression of vibration associated with air turbulence is an important feature for reduced noise inside the bird.

In FIG. 4, a perspective view of a nose boom 48 is shown and mounted in front of the housing 12. The nose boom 48 includes three large surface cylindrical orthogonal electric dipoles 50, 52 and 54 disposed around the nose boom's exterior surface for measuring electric fields having a bandwidth from 0.01 Hz to 480 Hz. Dipole 50 is oriented for data measurements in a "X" axis, dipole 52 is oriented in a "Z" axis and dipole 54 is oriented in a "Y" axis.

The nose boom 48 is a cylindrical tube 5 inches in diameter and 24 inches in length projecting forward in the flight direction as shown. The dipoles 50, 52 and 54 are designed to have the large area surfaces of their connecting rods aligned with the airflow. This minimizes the effect of electrically charged dust particles impacting the surface of the connecting rods. The connecting rods form an important component of the invention. The same motion detectors 36 used for correcting for the effects of tilt motions of the pairs of magnetometers 30 in magnetic gradients are used for correcting for angular motions of the electric dipoles in the static vertical electric field gradient in the lower atmosphere. This electric field is in the order of 150 volts per meter and any noise effects due to angular motions of the dipoles in this field must be eliminated. This can be adequately achieved with this correction, which employs computer regression methods to eliminate components in the geophysical signals that are correlated with the angular motions as measured by the motion detectors. This is achieved at selected filtered frequencies of interest.

The design of the cylindrical dipoles 50, 52 and 54 is such that electrically charged dust particles within the atmosphere either do not strike the surfaces of the dipoles or they only do so at grazing incidence, as indicated by arrows 55. As noted, this feature greatly reduces the noise effects from dust impacts that are associated with conventional dipoles. In addition, the dipoles are much more robust than conventional antenna dipoles and do not snag on objects during handling. They also have very large surface areas that provide them with high signal to noise ratios due to their excellent coupling with electric fields. Furthermore, they are lightweight and cover the full bandwidth of the invention from 0.01 Hz. Up to 480 Hz.

In FIG. 5, connecting rods 56 are shown connected to the dipoles 50, 52 and 54. The connecting rods 56 are connected to a data recording system in the helicopter or fixed wing aircraft. Also, the angular motion detectors 36 are connected to the data recording system. The dipoles are used to measure the three orthogonal components of electric fields through a broad frequency range down to almost direct current and along the X, Y and Z axis. The connecting rods 56 are connected to a routing cable 58, which is connected to amplifiers. The amplifiers are connected to the data recording system via the electrical cable 16.

The airborne low frequency electric field components are measured simultaneously in airborne survey system with the magnetic field components. The dipoles 50, 52 and 54 in the bird 10 are sensitive to angular motion in the vertical static field of the earth. But, for certain specific reasons, their sensitivity to angular motion is about one hundred times less than is the case for orthogonal axis coils 38, 40 and 42. Thus the angular motion sensors 36 are adequate to provide compensation for angular motion of the dipoles using post-flight regression techniques.

In FIG. 6, an alternate embodiment of the subject airborne survey system is shown greatly simplified. In this embodiment, the bird 10 is used for measuring the magnetic field with only a single total field cesium magnetometer 30 for measuring frequencies of 3 Hz and lower. This approach also eliminates the axis coils 38, 40 and 42, which in turn greatly minimizes vibration problems and weight in the bird 10.

In this simplified version, the EM magnetic field measurements at 3 Hz and lower, are restricted only to those components of the fields as resolved in the direction of the earth's total magnetic field. However, the time derivative of these fields provides a measurement that is proportional to the horizontal gradient of these fields. Data sampling rates in the recording system can also be reduced from 1000 per second to 100 per second, which lowers the cost of data processing. The electric field data from the dipoles is fully retained in this simplified version of the survey system and is the prime exploration data. The bandwidth of the measurements, in this embodiment of the bird 10, covers from 0.01 Hz to 30 Hz. in the electric field and 0.01 Hz. to 3 Hz. in the magnetic field. These frequency ranges have proven to be fully adequate for both oil and mineral exploration since the very low frequencies are the ones of prime importance in identifying highly characteristic dielectric polarization effects over oil and gas fields and also induced polarization effects over sulfide type mineral deposits. These frequencies are also appropriate for the exploration for aquifers, where again the low frequency dielectric polarization effects are of critical importance.

In this drawing in FIG. 6, the dipoles 50, 52 and 54 are connected using the routing cable 58 to electric dipole amplifiers 60. The amplifiers 60 are connected to the data recording system. A vertical accelerometer 62 is also connected to the data recording system as is a three orthogonal angular motion detector 36. The magnetometer 30 is connected to a magnetometer data processing unit 64, which in turn is connected to the data recording system via the electrical cable 16 inside the tow cable 14.

EM gradient data is acquired in the flight direction by using the derivatives of the filtered magnetometer outputs. The outputs are filtered at the desired frequencies from 3 Hz. down to 0.05 Hz. The angular motion noise is eliminated from the electric field data in post-flight processing using the angular motion detector 36. Some noise can be created in the filtered EM magnetic data due to vertical motions within a strong vertical magnetic gradient field from the ground. This occurs in highly mineralized mining districts, but not during oil and gas surveys. The noise can be eliminated in post-flight processing using data from the vertical accelerometer 62. The output from the accelerometer 62 is filtered at the desired frequencies being measured and is regressed out of the similarly filtered magnetometer EM output.

It should be mentioned that a version of the simplified bird design can also be used for ground follow up of an airborne survey. This equipment detects the same induced polarization and dielectric polarization effects as detected in the airborne survey. The equipment used in the simplified version is light enough to be carried by one person Also, the survey system is further applicable to offshore surveys for oil and gas. The low frequency magnetotelluric fields penetrate through up to 1000 feet of seawater and the telluric currents induced over the land masses tend to flow for considerable distances out from the shore line. In areas such as the North Sea in Europe where the distances between land masses are small and much of the sea water is shallow, the use of the invention has considerable potential.

Figure 7:
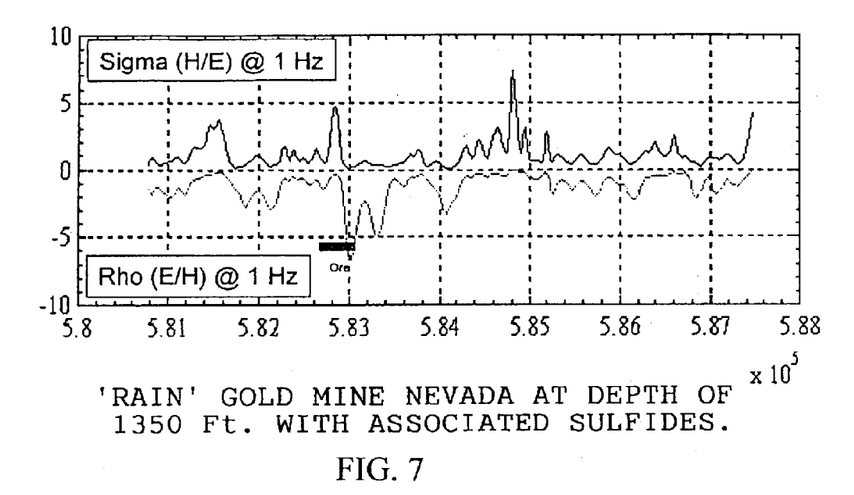
FIG. 7 shows the response of the bird flown over a 'blind' high-grade gold deposit and illustrates low frequency flanking conductive and resistive responses that relate to the induced polarization effect in sulfides.

In FIG. 7, another example of a traverse flight is shown across a major 'blind' gold deposit in Nevada. Plots of the conductive response (H/E) and the resistive response (E/H) illustrate their flanking nature. This is the typical signature of the very low requency induced polarization effects which are a strong indication of sulfide mineralization that is unique to the invention.

Figure 8:
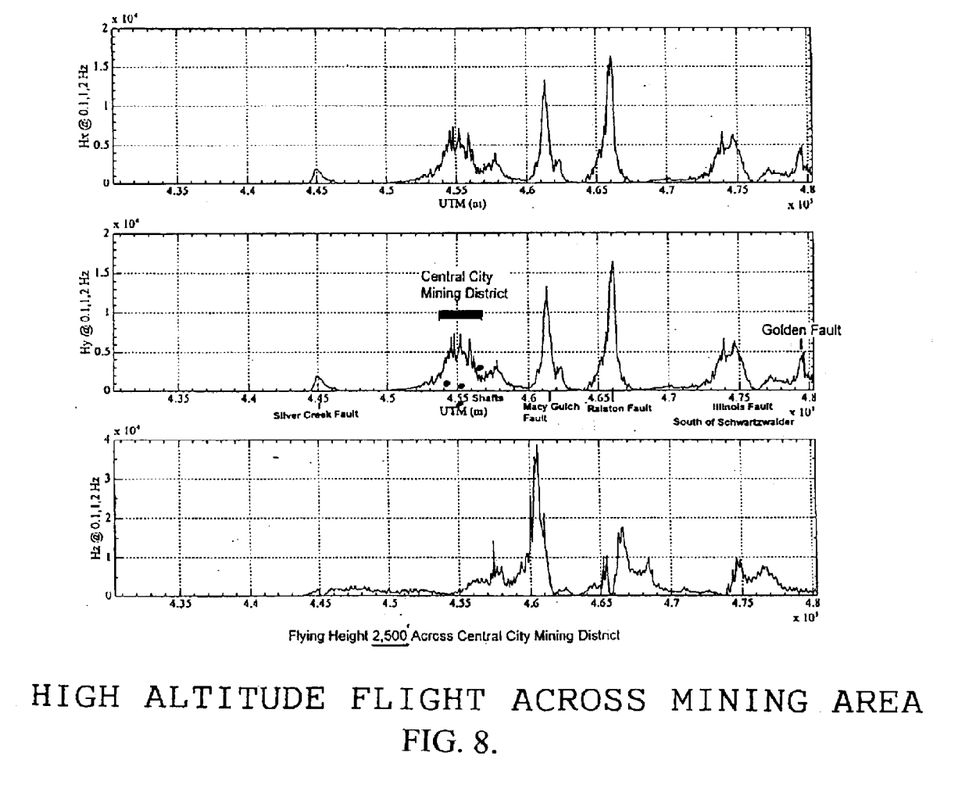
FIG. 8 illustrates the response of the survey bird flown across a major mining district, Central City, Colo., at a very unusual flying height of 2,500 ft with no cultural interference.

In FIG. 8 a response using the survey bird 10 is shown when flown across a major mining district, Central City, Colo., at a very unusual flying height of 2,500 ft There is no cultural interference which would be severe at conventional airborne survey heights.

Figure 9:
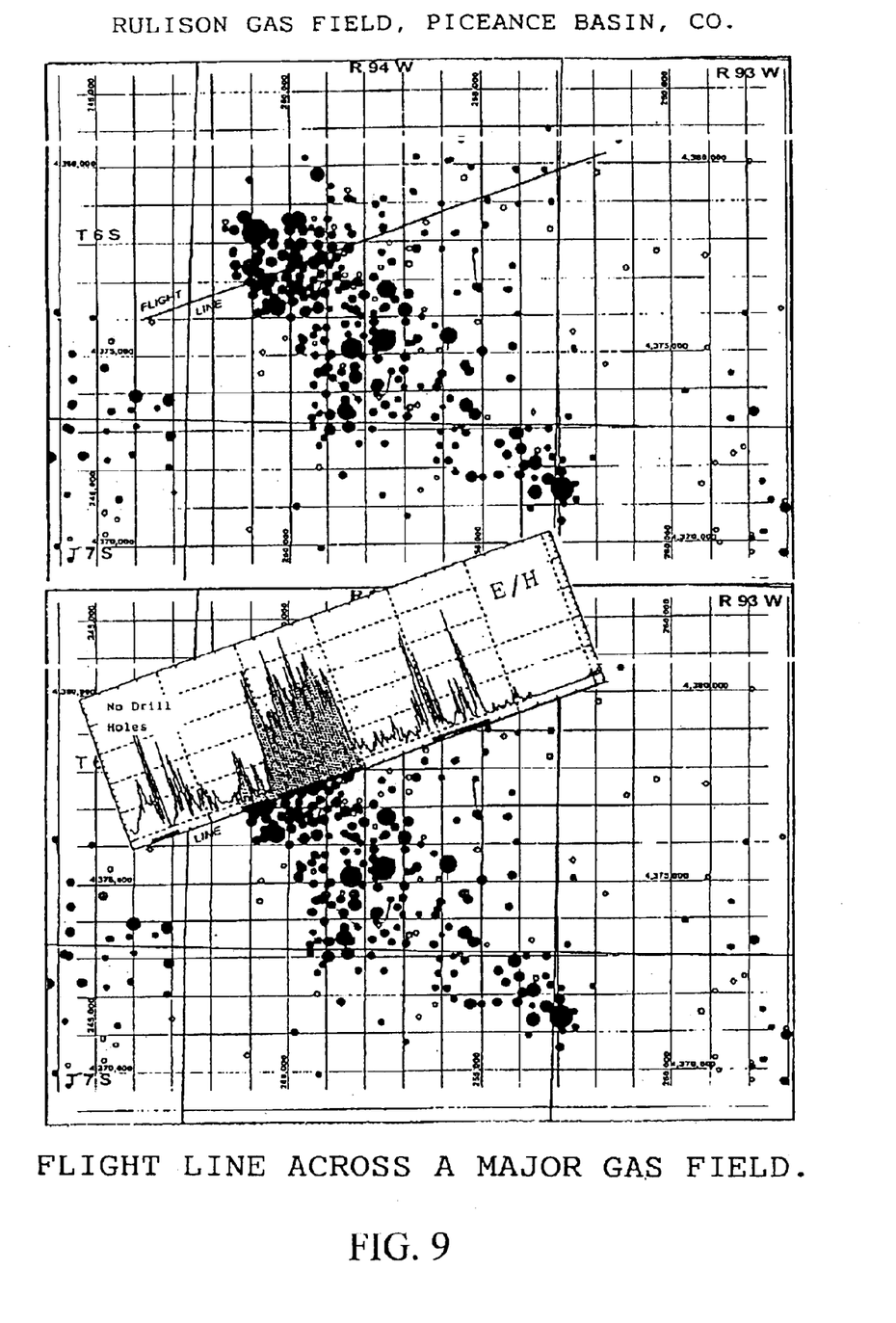
FIG. 9 illustrates the response of the survey bird flown across a major, deep-seated gas field.

In FIG.9, an example of the type of data acquired in a flight across a major gas field is shown. The data was obtained by dividing the electric field response (E) by the magnetic field response (H). The highly directional response of the field is due to the presence of oriented fractures that make the field productive.

Figure 10:
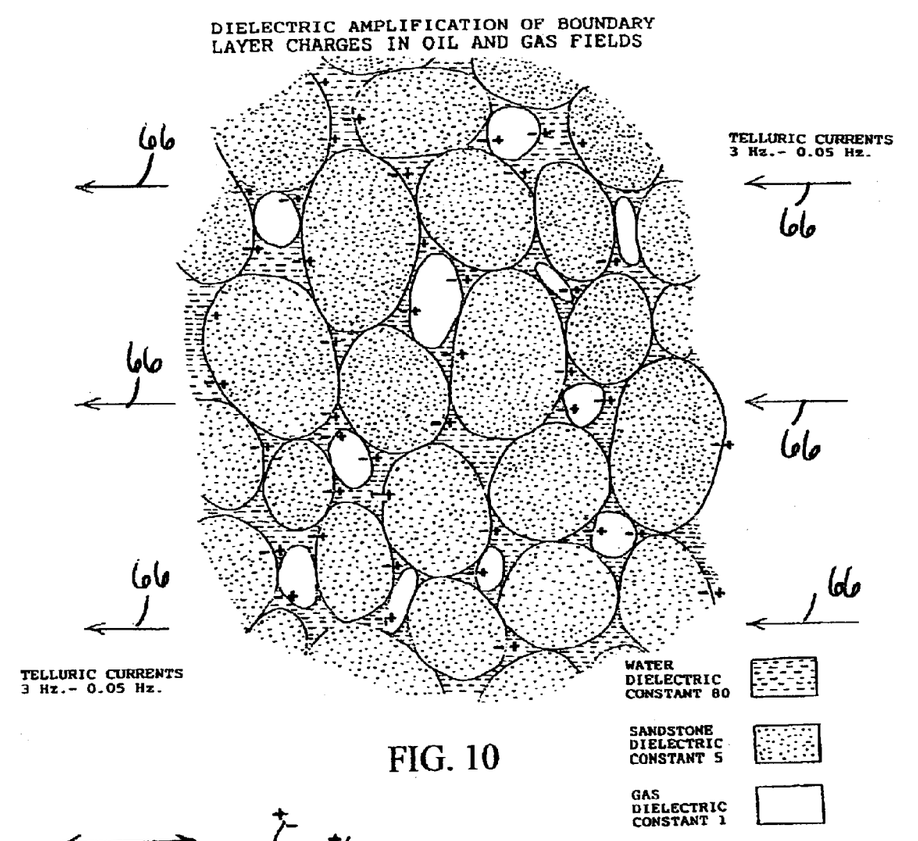
FIG. 10 illustrates dielectric interfacial boundary charges at boundaries of sandstone grains, water and gas.

In FIG. 10, the dielectric interfacial boundary charges at boundaries of sandstone grains, water and gas is illustrated. It is extremely important to note that the electric fields detected by the airborne survey system described above are associated with the dielectric charge effects at hydrocarbon/water contacts as shown in this drawing. The hydrocarbon/water contacts exhibit very high contrast in both dielectric constant and conductivity giving rise to electric charges in the presence of telluric currents. These currents are shown as arrows 66 and are extremely strong at very low frequencies. The telluric currents 66 are induced by magnetotelluric fields and are measured in the 0.05 to 3 Hz range by the dipoles and magnetometers as discussed.

A further important aspect of the invention is that the filtered values of the magnetic components of magnetotelluric fields, as measured in the air, are normalized in their amplitude for each frequency of interest against the corresponding filtered values as measured with the base station magnetometer. Thus the natural fluctuations of the magnetic field components are eliminated at each frequency of interest. The magnetic component fields at the base station at each selected frequency are also used as an amplitude and phase reference for the corresponding airborne electric fields since they are related.

The electric field measurements are first normalized in amplitude using the filtered values for the same set of frequencies as used for the magnetic field and as detected by the base station magnetometer. Both the compensated magnetic and electric components are then separated into in-phase and out-of-phase components using the base station magnetic data as a phase reference. Following this procedure, the ratio of the out-of-phase divided by the in-phase components in the case of the magnetic fields now increases with increasing resistivity. However, very importantly the ratio of the out-of-phase components divided by the in-phase components in the E fields increases in the presence of strong polarization effects. Such polarization effects can be caused either by the presence of sulfides due to the well-known geophysical effect of induced polarization. Alternatively, in the presence of increasing water content within the rocks, a dielectric polarization effect occurs. The latter is associated with the anomalously high dielectric constant of water of 80 and its relatively high conductivity as compared with the same parameters in rock materials and hydrocarbons.

The dielectric polarization effects associated with water can be clearly demonstrated experimentally operating with natural magnetotelluric fields under controlled laboratory type conditions. These tests involve the use of various concentrations of water in sand from 1 percent upwards.

Figure 11:
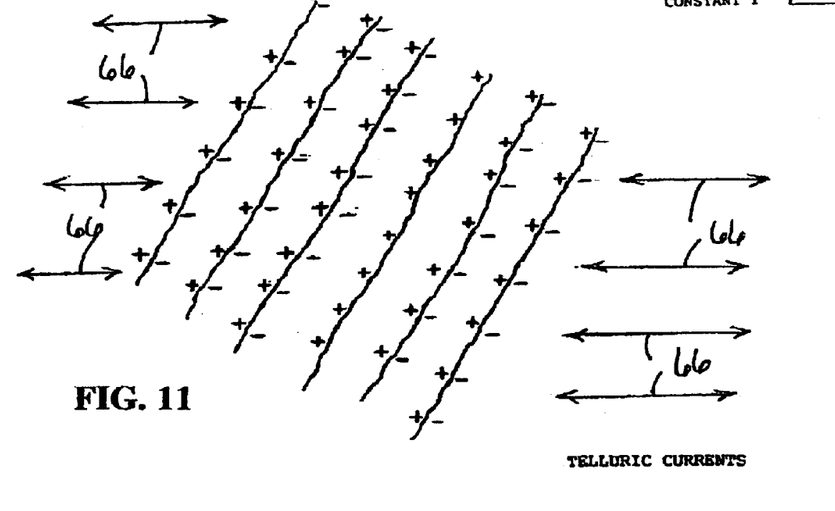
FIG. 11 illustrates telluric currents in underground water-saturated fractures when compared to surrounding rock with less water content.

In FIG. 11 telluric currents 66 are illustrated in underground water-saturated fractures when compared to surrounding rock with less water content. A very important factor in the invention described herein is that subsurface rock formations generally exhibit a degree of fracturing due to the effects of tectonic pressures. These fractures normally contain increased contents of ground water as compared to adjacent rock formations. This ground water, when intercepted by the large telluric currents induced by low frequency magnetotelluric fields, generate enhanced double layer electric charges due to the high contrast that exists in both dielectric constant and conductivity in the water-saturated fractures, when compared to surrounding rock with less water content. The resulting distribution of charges create an oriented secondary electric field that can be identified in the three-component electric field detection system described above.

The electric field effect occurs very commonly in sedimentary rocks as a result of tectonic pressures and the development of oriented fracture systems. In the case of oil and gas field development, the hydrocarbons tend to accumulate in the fractures leaving a film of water between the hydrocarbons and the walls of the fractures. These are the water-wet walls that are familiar to oil geologists. The result is a strongly enhanced orientation of secondary fields giving an effect known as anisotropy.

It is important to note that this effect is primarily detected in the electric field and has a lesser influence on magnetic field components of the magnetotelluric secondary fields that is generated by the underlying ground. For this reason, the measurement of each component of the electric field is considerably more important than the measurement of three components of the magnetic field. Thus the simplified version of the survey system described in FIG. 6 in which only a single magnetometer is employed for measuring the magnetic components of the EM fields exclusively in the direction of the total earth's magnetic field is quite adequate to give useful data results. What is critically important is the retention in the simplified version of the invention is the measurement of the three orthogonal electric field components using the dipoles 50, 52 and 54. The data found can show strongly enhanced anisotropy over oil and gas fields.

Also, related effects can also occur over sulfide and metallic mineralized deposits when fracture orientation is not uncommon. In this case, the sulfides or native metals tend to accumulated in fractures and produce some of the same anisotropic effects as noted for oil and gas. The charge distribution that occurs is this situation is due to the well known induced polarization effects that occur at boundaries between ionic conduction and electronic conduction when current flows through these boundaries.

The embodiments of the invention for which as exclusive privilege and property right is claimed are defined as follows:

1. A magnetotelluric geophysical survey system for natural resource exploration of oil and gas, mineral deposits and aquifers, the survey system using natural electromagnetic fields as an energy source, the survey system comprising:
   an aerodynamic airborne survey bird;
   electric dipoles mounted on said survey bird, said electric dipoles measuring electric fields in a frequency range from 0.01 Hz. to 480 Hz.;
   an angular motion detector mounted inside said survey bird and used for compensating for errors caused by angular motion of said bird when in the presence of strong electric field gradients; and
   an airborne data recording system connected to said bird and said electric dipoles for receiving and storing electric field data measurements from said electric dipoles, said data recording system also connected to said angular motion detector for receiving and storing angular motion measurements.

2. The survey system as described in claim 1 wherein said electric dipoles include a first dipole for taking data measurements in a horizontal X axis perpendicular to a length of said bird, a second dipole for taking data measurements in a horizontal Y axis parallel to the length of said bird and a third dipole for taking data measurements in a vertical Z axis perpendicular to the length of said bird.

3. The survey system as described in claim 1 wherein said electric dipoles are mounted on a non-conductive nose boom mounted in front of a housing of said survey bird, said dipoles in the form of large conductive cylindrical surfaces disposed around said nose boom's exterior surface.

4. The survey system as described in claim 1 wherein said dipoles are connected to connecting rods attached to a routing cable, said routing cable connected to an electric dipole amplifier, said amplifier connected to said data recording system.

5. The survey system as described in claim 1 further including a total field alkali vapor magnetometer mounted inside said survey bird for measuring low frequency electromagnetic gradients, said magnetometer connected to a vertical accelerometer for compensating for errors caused by vertical motions of said bird when in the presence of strong vertical magnetic gradients, said magnetometer connected to said data recording system, said data recording system receiving and storing magnetic field data measurements from said magnetometer, said data recording system receiving and storing vertical motion measurements from said vertical accelerometer.

6. The survey system as described in claim 5 wherein said magnetometer records total magnetic field data measurements filtered in a frequency range from 0.01 Hz to 3 Hz in order to extract magnetic components of electromagnetic EM fields, said magnetic components oriented in a direction of the earth's magnetic field.

7. The survey system as described in claim 1 further including a ground base station connected to said airborne data recording system, said ground base station having a magnetometer, associated recording equipment and a GPS time reference for synchronization with electric and EM magnetic field data measurements received from said airborne data recording system.

8. The survey system as described in claim 1 further including orthogonal axis coils mounted in said bird and connected to said data recording system and connected to said motion detector, said orthogonal axis coils measuring natural magnetic field data in a frequency range of 3 to 480 Hz.

9. A magnetotelluric geophysical survey system for natural resource exploration of oil and gas, mineral deposits and aquifers, the survey system using natural electromagnetic fields as an energy source, the survey system comprising:

an aerodynamic airborne survey bird;

three electric dipoles mounted on said survey bird, said electric dipoles measuring electric fields in a frequency range from 0.01 Hz to 480 Hz., said dipoles taking data measurements in a horizontal X axis and horizontal Y axis perpendicular and parallel to a length of said bird and a vertical Z axis perpendicular to the length of said bird;

an angular motion detector mounted inside said survey bird for compensating for errors caused by angular motion of said bird when in the universal presence of strong vertical electric field gradients above the earth's surface; and an airborne data recording system connected to said bird and said three electric dipoles for receiving and storing electric field data measurements from said electric dipoles, said data recording system also connected to said angular motion detector for receiving and storing angular motion measurements.

10. The survey system as described in claim 9 wherein said three electric dipoles include a first dipole for taking data measurements in the horizontal X axis perpendicular to a length of said bird, a second dipole for taking data measurements in the horizontal Y axis parallel to a length of said bird and a third dipole for taking data measurements in the vertical Z axis perpendicular to the length of said bird.

11. The survey system as described in claim 9 wherein said electric dipoles are mounted on a non-conductive nose boom mounted in front of a housing of said survey bird, said dipoles in the form of aerodynamic large cylindrical metal surfaces disposed around said nose boom's exterior surface for providing a high signal to noise ratio.

12. The survey system as described in claim 9 further including at least one magnetometer mounted inside said survey bird for measuring low frequency electromagnetic EM fields, said magnetometer connected to a vertical accelerometer for compensating for errors caused by vertical motions of said bird when in the presence of strong vertical magnetic gradients above the earth's surface, said magnetometer and said vertical accelerometer connected to said data recording system, said data recording system receiving and storing magnetic field data measurements from said magnetometer and receiving and storing vertical motion data from said vertical accelerometer for post-flight processing.

13. The survey system as described in claim 12 wherein said magnetometer records magnetic field data measurements in a frequency range from 0.01 Hz. to 3 Hz.

14. The survey system as described in claim 12 further including a first pair of magnetometers mounted on said bird for providing differential magnetic and low frequency electromagnetic field gradients along a X axis perpendicular to a length of said bird and a second pair of magnetometers mounted on said bird for providing differential magnetic and low frequency electromagnetic field gradients along a Y axis parallel to the length of said bird, said first and second pairs of magnetometers used in conjunction with said angular motion detector and said data recording system for post-flight processing.

15. The survey system as described in claim 9 further including three orthogonal axis coils mounted in said bird and connected to said data recording system and connected to said motion detector, said orthogonal axis coils measuring natural magnetic field data in a frequency range of 3 to 480 Hz and along a horizontal X and Y axis perpendicular and parallel to a length of said bird and vertical Z axis perpendicular to the length of said bird.

16. A magnetotelluric geophysical survey system for natural resource exploration of oil and gas, mineral deposits and aquifers, the survey system using natural electromagnetic fields as an energy source, the survey system comprising:

an aerodynamic airborne survey bird;

a first electric dipole for taking data measurements in a horizontal X axis perpendicular to a length of said bird, a second electric dipole for taking data measurements in a horizontal Y axis parallel to the length of said bird and a third electric dipole for taking data measurements in a vertical Z axis perpendicular to the length of said bird, said dipoles mounted on said bird and measuring electric fields in a bandwidth range of 0.01 Hz to 30 Hz;

an angular motion detector mounted inside said survey bird for compensating for errors caused by angular motion of said bird when in the presence of strong electric field gradients;

an airborne data recording system connected to said bird and said first, second and third electric dipoles for receiving and storing electric field data measurements from said electric dipoles, said data recording system also connected to said angular motion detector for receiving and storing angular motion measurements; and at least one magnetometer mounted inside said survey bird for measuring low frequency electromagnetic EM fields, said magnetometer connected to a vertical accelerometer for compensating for errors caused by vertical motions of said bird when in the presence of strong vertical magnetic gradients, said magnetometer connected to said recording system, said recording system receiving and storing low frequency magnetic EM field data measurements and vertical accelerometer data measurements from said magnetometer and from said vertical accelerometer.

17. The survey system as described in claim 16 wherein said electric dipoles are mounted on a non-conductive nose boom mounted in front of a housing of said survey bird, said dipoles in the form of aerodynamic large cylindrical metal surfaces disposed around said nose boom's exterior surface for providing a high signal to noise ratio.

18. The survey system as described in claim 16 wherein said magnetometer records magnetic EM field data measurements in a frequency range from 0.05 Hz. to 3 Hz.

19. The survey system as described in claim 16 further including a first pair of magnetometers mounted on said bird for providing magnetic and low frequency electromagnetic field gradients along a horizontal X axis perpendicular to a length of said bird and a second pair of magnetometers mounted on said bird for providing magnetic and low frequency electromagnetic field gradients along a horizontal Y axis parallel to the length of said bird, said first and second pairs of magnetometers connected to said angular motion detector and said data recording system.

20. The survey system as described in claim 19 wherein said first and second pairs of magnetometers measure magnetic field data measurements in a frequency of 0.01 Hz to 3 Hz and along the horizontal X and Y axis.

* * * * *